3,129,896
SEPARATION OF HEAVY METAL CONSTITUENTS OF TIN SLAG

Sidney M. Heins, Chicago, Ill., assignor to Chemical Products Corporation, Chicago, Ill., a corporation of Illinois
No Drawing. Filed June 18, 1962, Ser. No. 202,947
8 Claims. (Cl. 241—22)

This invention concerns processes for the recovery of metal constituents from slag and particularly to an improved method for separating the heavy metal constituents from tin slag.

The slag produced during the smelting of tin often contains valuable heavy metals, such as niobium (columbium) and tantalum. However the cost of separating these metallic elements from the non-metallic constituents of the slag, by the procedures heretofore used, is so great as to make such recovery uneconomical and hence the slag is usually dumped as waste. Electrostatic and electromagnetic separation of metals from non-metallic materials is well known, but such processes are highly inefficient in the case of niobium and tantalum because these materials are only feebly magnetic and the slag itself is normally non-conductive.

I have discovered that tin slag can be rendered conductive by simple and economically feasible means and that when so treated the slag can be subjected to electrostatic separation techniques which make the recovery of the heavy metal constituents economically worthwhile. Therefore, the main objects of my present invention are to provide an improved process for the separation of the metal constituents from the tin slag; to provide an improved process for the pretreatment of slag to render it conductive and amenable to electrostatic separation procedures; to provide an improved process for the preparation of tin slag for the recovery of its heavy metal constituents by electrostatic means; and to provide an improved process for separating niobium and tantalum from tin slag.

Essentially, the novel concept involved in the present invention is to break up the crystal structure of the slag by fine grinding, remove the magnetic particles by high intensity electromagntic separation, treat the comminuted material with a chemical suitable to render the slag electrically conductive, and then to subject the treated material to electrostatic separation procedures for the recovery of the heavy metal constituents.

Without such pretreatment, to first render the slag conductive, it is practically impossible to recover the niobium and tantalum constituents of tin in commercially economical quantities by the electrostatic process.

In carrying out this concept, I prefer to first grind or crush the slag to a particle fineness not greater than about 100 mesh and remove the magnetic particles. Then, according to one procedure, this fine slag material is combined with a suitable salt, which when coated on the slag particles will make them electrically conductive, and the mixture is fused by heating it to a temperature sufficient to melt the salt. When fusion is completed the material is allowed to cool and is reground to about 100 mesh. The result of this treatment is a finely ground electrically conductive slag and as the next step in the separating out of the heavy metals this material is subjected to an electrostatic separator of the rotor type. Finally, all traces of the chemical salt are removed by washing the metallic material removed by the separator.

In practice I have found that alkali salts such as the chlorides of calcium, potassium and sodium, or the nitrates of aluminum, ammonium, barium, potassium and sodium, used alone and in combination, are suitable for fusion with the ground slag to render the slag material electrically conductive so that it will be operative for electrostatic separation.

For example, a half-and-half mixture of sodium chloride and sodium nitrate mixed with the ground slag and then fused at a temperature of approximately 400 to 600° F., the amount of salt being 20 to 25 percent by weight of the ground slag, will provide a very satisfactory pretreatment of the slag for electrostatic separation of the heavy metals from the siliceous material.

I have also found that when the salt employed is a nitrate, the addition of comminuted charcoal, in an amount up to approximately 10 percent by weight of the ground slag, serves to increase speed of the fusion process, by causing it to become exothermic, and that the resulting fused product has a somewhat stronger conductivity.

In addition to the fusion process for coating the slag particles to render them conductive, I have found that tin slag can be processed, so as to be amenable to electrostatic separation procedures, by immersing the finely ground slag in a brine solution. The thoroughly wetted slag is then dried and broken up and the resulting salt coated material is ready for electrostatic separation of the heavy metal components.

The main advantages of this invention reside in the fact that by a relatively cheap and simple chemical pretreatment process, tin slag can be made amenable to the electrostatic method of separation of the heavy metal constituents of the slag; and in the fact that by virtue of chemical pretreatment of tin slag the recovery of the heavy metal constituents can be accomplished efficiently and in an economically practical manner.

I claim:

1. The method of preparing slag for the recovery of its metallic constituents which comprises the steps of comminuting the slag to a maximum particle size of about 100 mesh, fusing the comminuted slag with a salt to render the slag electrically conductive, and then comminuting the fused slag to a fineness of about 100 mesh.

2. The method of preparing slag for the recovery of its metallic constituents as defined in claim 1 wherein the salt is selected from the group comprising the nitrates of aluminum, ammonium, barium, potassium and sodium and the chlorides of calcium, potassium and sodium.

3. The method of preparing slag as defined in claim 2 wherein the amount of salt employed in the fusion step is from 20 to 25 percent by weight of the comminuted slag.

4. The method of preparing tin slag for the recovery of niobium and tantalum by electrostatic separation which comprises the steps of comminuting the slag to a maximum particle size of about 100 mesh, fusing the comminuted slag with a salt in sufficient quantity to render the slag electrically conductive, and then comminuting the fused slag to a fineness of about 100 mesh.

5. The method of preparing tin slag as defined in claim 4 wherein the salt is selected from the group consisting of the chlorides of calcium, potassium and sodium and the nitrates of aluminum, ammonium, barium, potassium and sodium.

6. The method of recovering the heavy metal constituents of tin slag which comprises the steps of
    (a) comminuting the slag to a fineness of about 100 mesh,
    (b) fusing the comminuted slag with a salt to render it electrically conductive,
    (c) comminuting the fused slag to a fineness of about 100 mesh, and then
    (d) subjecting the comminuted fused slag to an electrostatic separation procedure.

7. The method of recovering niobium and tantalum from tin slag which comprises the steps of
    (a) comminuting the slag to a maximum particle size of about 100 mesh, (b) fusing the comminuted slag with 20 to 25 percent by weight of a salt mixture comprising one-half sodium chloride and one-half sodium nitrate, (c) comminuting the fused slag to approximately 100 mesh, and then (d) subjecting the comminuted fused slag to electrostatic separation of its constituents.

8. The method of recovering niobium and tantalum from tin slag which comprises the steps of (a) comminuting the slag to a particle size not greater than about 100 mesh, (b) fusing the comminuted slag at a temperature in the range of 400 to 600° F. with a mixture comprising (1) 20 to 25 percent by weight of a salt mix consisting of equal parts of sodium chloride and sodium nitrate and (2) up to 10 percent by weight of comminuted charcoal, (c) comminuting the fused slag to approximately 100 mesh, and (d) subjecting the comminuted fused slag to electrostatic separation of its constituents.

References Cited in the file of this patent

UNITED STATES PATENTS 2,556,483     Peery et al. _____ June 12, 1951

FOREIGN PATENTS 1,108,632     Germany _____ June 15, 1961

OTHER REFERENCES

"Electromagnetic Separations of Solids," by F. Fraas et al., vol. 32, Ind. and Eng. Chemistry No. 5, pp. 600–604.